United States Patent
Wollnik et al.

(10) Patent No.: US 9,501,656 B2
(45) Date of Patent: Nov. 22, 2016

(54) MAPPING GLOBAL POLICY FOR RESOURCE MANAGEMENT TO MACHINES

(75) Inventors: Matthias Wollnik, Seattle, WA (US); Nir Ben-Zvi, Redmond, WA (US); Judd Hardy, Issaquah, WA (US); Ivelin L. Zheglov, Duvall, WA (US); Ravindra Mysore Seetharam, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 233 days.

(21) Appl. No.: 13/079,987

(22) Filed: Apr. 5, 2011

(65) Prior Publication Data

US 2012/0260303 A1 Oct. 11, 2012

(51) Int. Cl.
*G06F 21/62* (2013.01)

(52) U.S. Cl.
CPC .................... *G06F 21/6218* (2013.01)

(58) Field of Classification Search
CPC ............................ G06F 21/6218; H04L 63/20
USPC ................................................ 726/1–4, 26–30
See application file for complete search history.

(56) References Cited

U.S. PATENT DOCUMENTS

| | | | |
|---|---|---|---|
| 8,244,841 B2* | 8/2012 | Shaji et al. .................... | 709/223 |
| 2004/0010519 A1 | 1/2004 | Sinn | |
| 2004/0199566 A1* | 10/2004 | Carlson et al. ............... | 709/201 |
| 2004/0204949 A1* | 10/2004 | Shaji et al. ....................... | 705/1 |
| 2004/0215650 A1 | 10/2004 | Shaji | |
| 2009/0158384 A1* | 6/2009 | Kanade ................. | G06F 21/604 726/1 |
| 2010/0043049 A1* | 2/2010 | Carter et al. ...................... | 726/1 |
| 2010/0115101 A1 | 5/2010 | Lain | |
| 2010/0154025 A1 | 6/2010 | Esteve Balducci | |
| 2010/0274750 A1* | 10/2010 | Oltean et al. .................. | 706/47 |

OTHER PUBLICATIONS

Jakob H. Heidelberg (How to Force Remote Group Policy Processing, Published on Feb. 13, 2007 on WindowSecurity.com, 8 pages).*
SolutionBase: Learn how to take advantage of the Group Policy Management, Feb. 18, 2004.
Folder Redirection GPO, Nov. 25, 2010 (Retrieved Date).
Find Group Policy (GPO) Setting Conflicts using PowerShell, Darren Mar-Elia, Feb. 18, 2004.
Configure a Mapped Drive ItemApplies To: Windows Server 2008 R2, Nov. 25, 2010 (Retrieved Date).

* cited by examiner

*Primary Examiner* — Saleh Najjar
*Assistant Examiner* — Oleg Korsak
(74) *Attorney, Agent, or Firm* — Danielle J. Holmes; Judy Yee; Micky Minhas (57) ABSTRACT

A global policy is applied to only select resources (e.g., certain file folders) based on property settings associated as metadata with those resources. The resource property settings correspond to a defined property set (e.g., a global taxonomy) that is consistent with the global policy. When global policy is received, the property metadata for each resource determines whether to apply the global policy to that resource. In this way, a central administrator may provide the defined property set, a policy author may provide the policy, and a local administrator may set the resource property settings.

20 Claims, 9 Drawing Sheets

FIG. 9

MAPPING GLOBAL POLICY FOR RESOURCE MANAGEMENT TO MACHINES

BACKGROUND

In an organization such as a large corporation or other enterprise, it is common to want to apply a global policy to the organization's resources, including to its data. By way of example, an organization may wish to set an expiration policy (e.g., three years) for application data that has not been modified within that timeframe so as to have such data archived or deleted.

However, due to various circumstances, individual computing machines may be subject to different policy needs, and as a result, defining a global policy for resource management on a set of computers is difficult. For example, a policy that may apply to all of the folders on one machine may only apply to one folder on another machine. A more particular example of one such policy may be to enable a "legal hold" where some folders on a set of machines cannot be modified due to pending litigation; thus, the example three-year global expiration policy described above cannot apply to that particular set of folders on these machines. Heretofore there was no straightforward way to apply policies on a global (e.g., enterprise-wide) basis yet account for different policy needs.

As a result, administrators are often forced to define resource management policies on each computing machine individually. Alternatively, administrators may need to standardize machines to some extent (e.g., all machines have to have folders with certain names) so they can deploy the same policy on the specific set of resources that need to exist on each machine. Each of these alternatives is very limiting and tends to result in administrators abandoning or significantly restricting their efforts to define global policy.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which property metadata, corresponding to one or more property settings of a defined property set (e.g., a global taxonomy), is maintained in association with a resource of a computing machine of a plurality of machines. When global policy for those machines is received, the property metadata for each resource is accessed to determine whether to apply the global policy to that resource. For example, if the resource comprises a folder, share, UNC path or file, the property metadata determines whether global policy applies to that folder, share, UNC path or file, and if so, performs one or more actions specified in the global policy, e.g., to the files therein.

In one aspect, a central administrator may provide the defined property set, and the property metadata may be received via a user interface that is operated by a local administrator who is different from the central administrator. In one aspect, a policy author (who may be different from the local administrator) provides the policy.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards associating certain properties/property settings with computer resources, and then selectively applying global policy to each resource based upon its associated property settings. To this end, when the global policy is applied to a machine, the resources with properties set that match the policy's condition (criterion or criteria) have the policy applied to them. For example, a property may be set for a resource comprising a folder/share/UNC (Uniform Naming Convention) path/file, and policy written so as to only apply to resources with that particular property.

As a result, when a data management policy (such as a file management task) is pushed to a machine, the policy does not have a specific scope (e.g., set of folders) assigned to it. Instead the policy has a dynamic scope characterized by a condition that references a property (as defined in a well-known or global taxonomy). Resources such as folders/shares/UNC paths/files on individual computers may have these properties and values for the properties assigned to them as metadata. Thus, if the property changes, e.g., is deleted, or is created, the folder/share/UNC path/file now may be subject to some global policies to which it was previously not subject to (the property now matches the condition of the dynamic scope of the policy), and/or no longer may be subject to a global policy that previously applied (the property no longer matches the condition of the dynamic scope of the policy).

It should be understood that any of the examples herein are non-limiting. For one, while some of the examples use a "folder" (or similarly a share/UNC path/file) as a resource for which properties may be defined and set and global policy may be defined and applied, any computing resource may benefit from the technology described herein. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and resource management in general.

Figure 1:
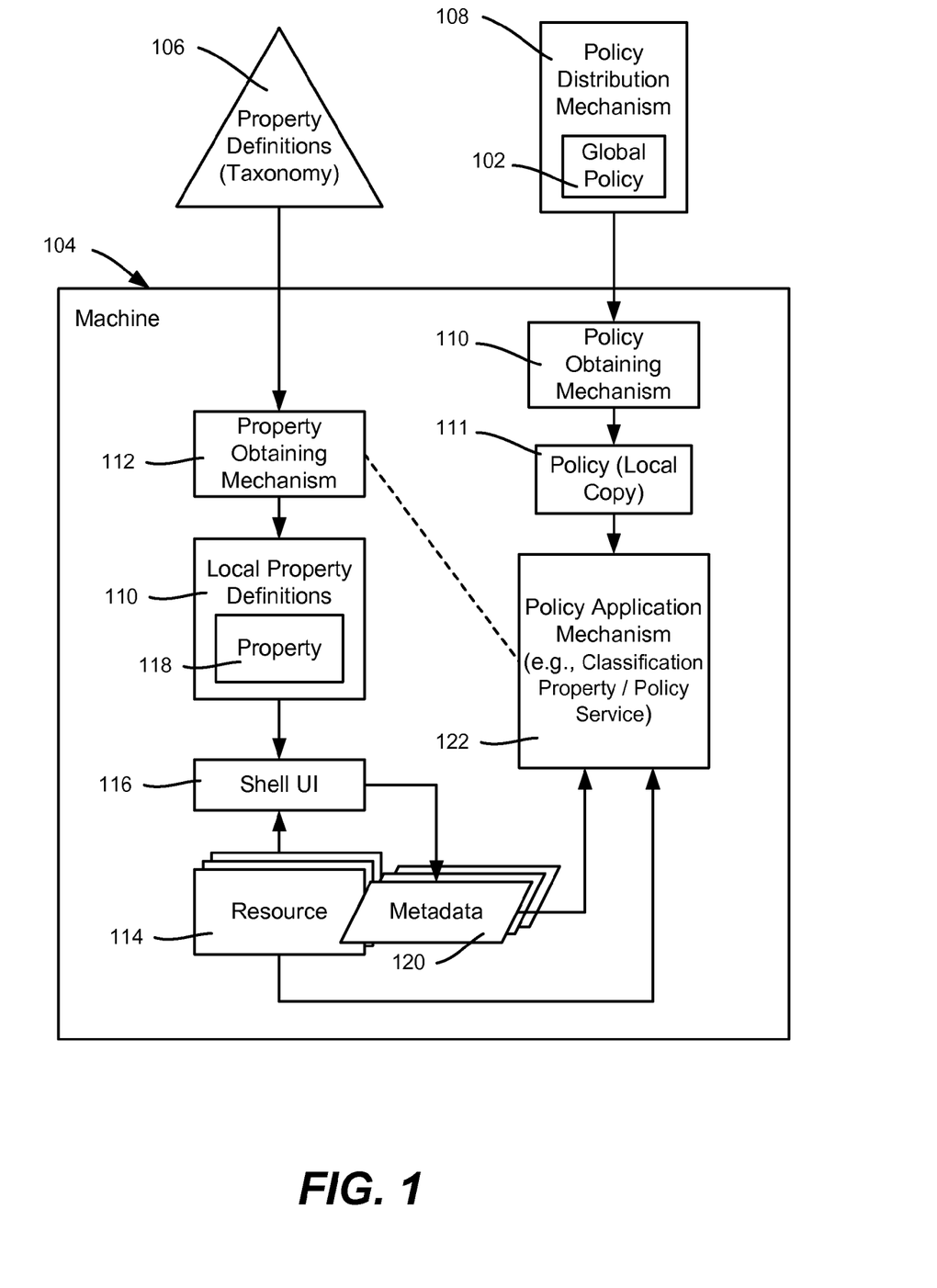
FIG. 1 is a block diagram representing example components configured to use defined resource properties to map global policy to machines for resource management.

FIG. 1 shows example components for applying global policy 102 to managed resources of a computing machine 104. To keep types of resources and their properties aligned with global policies, shared resource property definitions 106 (e.g., in an agreed-upon taxonomy) are provided for a plurality of machines, which may be all or less than all of the machines in the organization. In this way, the set of property definitions 106 (e.g., arranged as a taxonomy) is available for a set of machines to which global policy is to be applied. The set of machines to which the property definitions 106 apply may be all those in the organization, for example, or may be a partitioned subset of the machines, with corresponding group policy partitioning for the subsets.

By way of a simplified example, folders (one kind of resource) on file servers may be defined with a "type" property, such as to differentiate between folders that contain user data, team data, or application data. Global policy 102 may specify that the folders marked with a folder type property setting as "folder type=user data" (or specified in some similar nomenclature) have its (unmodified) files expire after two years, whereas "folder type=app data" files expire after three years, and so on. A policy may state that one type expires data after three years, another expires data after five years, and so forth, with the scope to which each applies selected (e.g., as part of a regular or continuous activity). Resources may have more than one associated property, e.g., a folder also may have one or more properties that define a data protection level, e.g., a "business impact" level, a secrecy level, and so on; global policy may specify that folders with a "high" business impact level or "high" secrecy level need to store their files in encrypted form. Further, policy may be applied to different resources in different ways, e.g., folders that are of folder type marked "app data" and are marked as "finance" may expire files via policy in seven years, whereas folders marked as "app data" folders and "human resource" folders may expire files via policy in three years, and so on. Thus, multiple types of metadata may be associated with machine resources and other resources and controlled by policy, e.g., apply some policy to a file if the type of machine is a "file server" type, and if the folder's associated security level is greater than or equal to medium; (note that such comparative level checking may be used). In general, any way to differentiate resources to which policy may be applied based on different resource properties and/or combinations thereof may be provided as property definitions having corresponding settings (e.g., appropriate values) for those property definitions 106 in the taxonomy.

Resources other than machines and/or folders/shares/UNC paths/files may be similarly tagged with associated metadata for applying global policy to those resources. Examples include storage devices (which may have multiple volumes), network interfaces, SharePoint® sites (or like collections), database tables or portions of tables, virtual machines, virtual hard disks, peripheral (e.g., USB) devices, CPU usage settings, memory usage settings, and so forth. By way of example, the quality of service (QoS) settings for a network interfaces in an enterprise may be controlled by global policy that selectively applies depending on the network interface's associated property metadata. As a more particular example, network interfaces that service audiovisual content may need a certain performance level, and thus may be tagged with "telecommunications interface" metadata so as to have QoS settings that differ, based on global policy, from network interfaces that serve other data and are thus tagged otherwise (or untagged and thus not controlled by the policy).

As represented in FIG. 1, the set of global policy 102, such as defined by a central administrator or the like, is made available to the machine 104 by a policy distribution mechanism 108 and policy obtaining mechanism 110 (e.g., in the form of policy language such as one or more .xml files pushed by Group Policy technology), where a local copy 111 is kept. If a global policy does not apply to any resource on a machine (no resource has properties that match the condition of the policy), the policy may be stored for future use on the local machine 104 but does not have any effect, unless and until a resource property is changed to match the condition.

The property definitions 106 are also made available to the machine 104, (e.g., via Active Directory® (AD) technology), as represented by property obtaining mechanism 112. The use of Group Policy and AD technology are only examples, used in one implementation, of how the appropriate property definitions and policy may be provided to any set or subset of machines; any suitable technology may be used.

In a typical enterprise, a local machine administrator or the like associates the local property definitions 110 with the resources 114 of the machine, and inputs a setting for each associated property 116. In one implementation, the local administrator uses the shell user interface 118 (or other suitable user interface) to select a resource and invoke a property-tagging user interface. For example, the local administrator may right click on a representation of a folder, and (such as via a sub-menu) obtain a user interface display that lists each of the various properties that may be set on the folder resource. Each property that can be set on the folder may be listed, with a radio button selection or the like that allows the local administrator to set the appropriate setting for that property, e.g., "high," "medium" or "low" for a folder's "business impact" property.

Once configured with the appropriate setting, metadata 120 is maintained that associates the property and its setting with the resource. Various ways of associating metadata 120 with a resource are known, including via a data store (e.g., database) and the like. When the resource is a folder, one suitable way to associate the metadata is to maintain a file in the folder that contains the metadata, which also has the benefit of moving with the folder in the event that the folder is moved, e.g., the policies have dynamic scopes. The file may be a system and/or hidden folder, and set with administrator permissions so that it cannot be modified or deleted by a non-administrator level user. Other ways to associate metadata with a resource are well known and may be used, e.g., in a file system structure such as a record or stream, in the internal memory of a storage device resource, network card resource, USB device resource, and so forth.

At a policy application time, such as periodically, or on demand when a property is set/changed on a resource and/or new policy is received, a policy application mechanism 122 applies any relevant part of the policy to each resource. In general, the policy application mechanism 122 processes each resource's associated property metadata, determines whether any condition set forth in the global policy applies, and if so, applies the policy to the resource.

Figure 2:
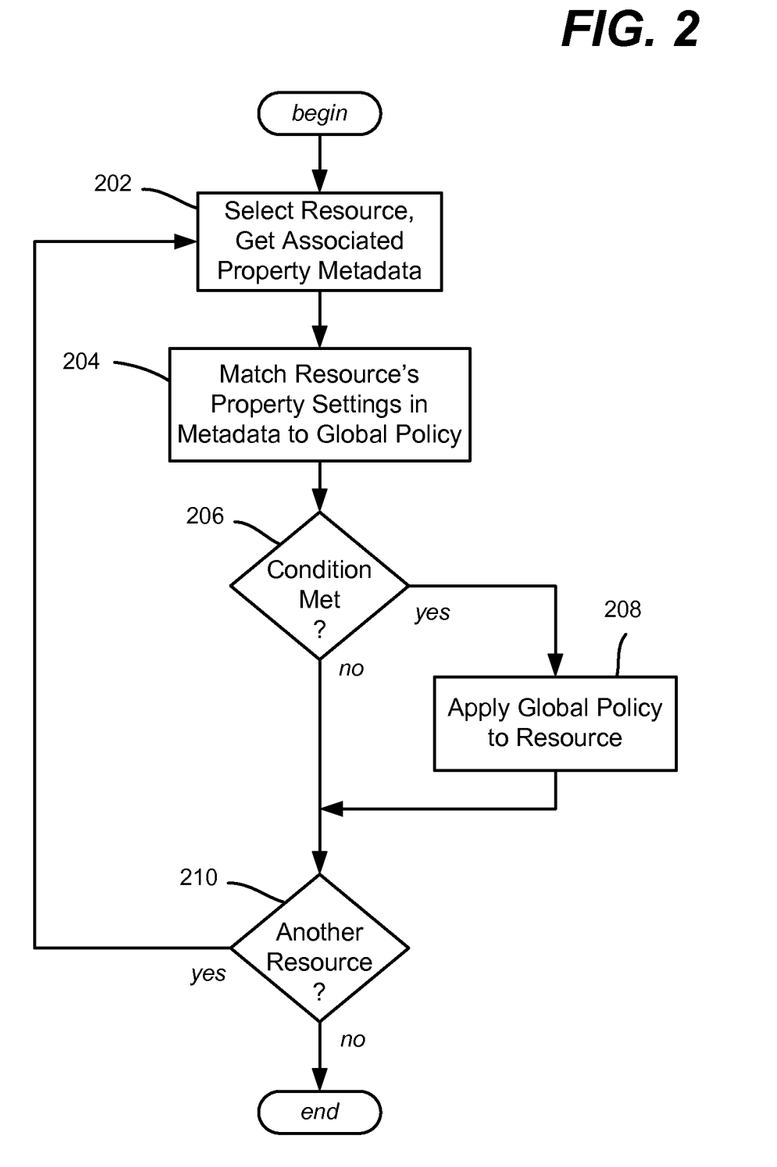
FIG. 2 is a flow diagram representing example steps for selectively applying global policy to resources based upon property metadata associated with those resources.

FIG. 2 shows example steps of this process, where the policy application mechanism 122 selects a resource and obtains its associated property metadata (step 202), and matches the property metadata against the global policy (step 204). If appropriate policy is defined and the condition (one or more criteria) is met at step 206, step 208 applies the global policy to the selected resource. Step 210 repeats the process for each resource.

In this way, when a resource's property is modified, or the set of global policies changes, the set of global policies that apply to that resource may be changed and the resource updated in some way based on the policy, when appropriate. Note that the set of resources to which a global policy is applicable may change due to the properties on resources changing. Further note that the policy may be evaluated against the resource property metadata at some suitable time, e.g., periodically.

Thus, in the "folder type" example above, if group policy specifies that any folder type set as being "user data" is to have its (unmodified) files expire after two years, the policy application mechanism 122 will find any folders tagged as such and expire (e.g., archive or delete) any files within the folder resource meeting this criterion. Note that the policy application mechanism 122 may use various logical combinations to determine how policy is to be applied, e.g., so as to not expire files in a "user data" folder type if that folder type is also set with a "legal hold" property.

Figure 3:
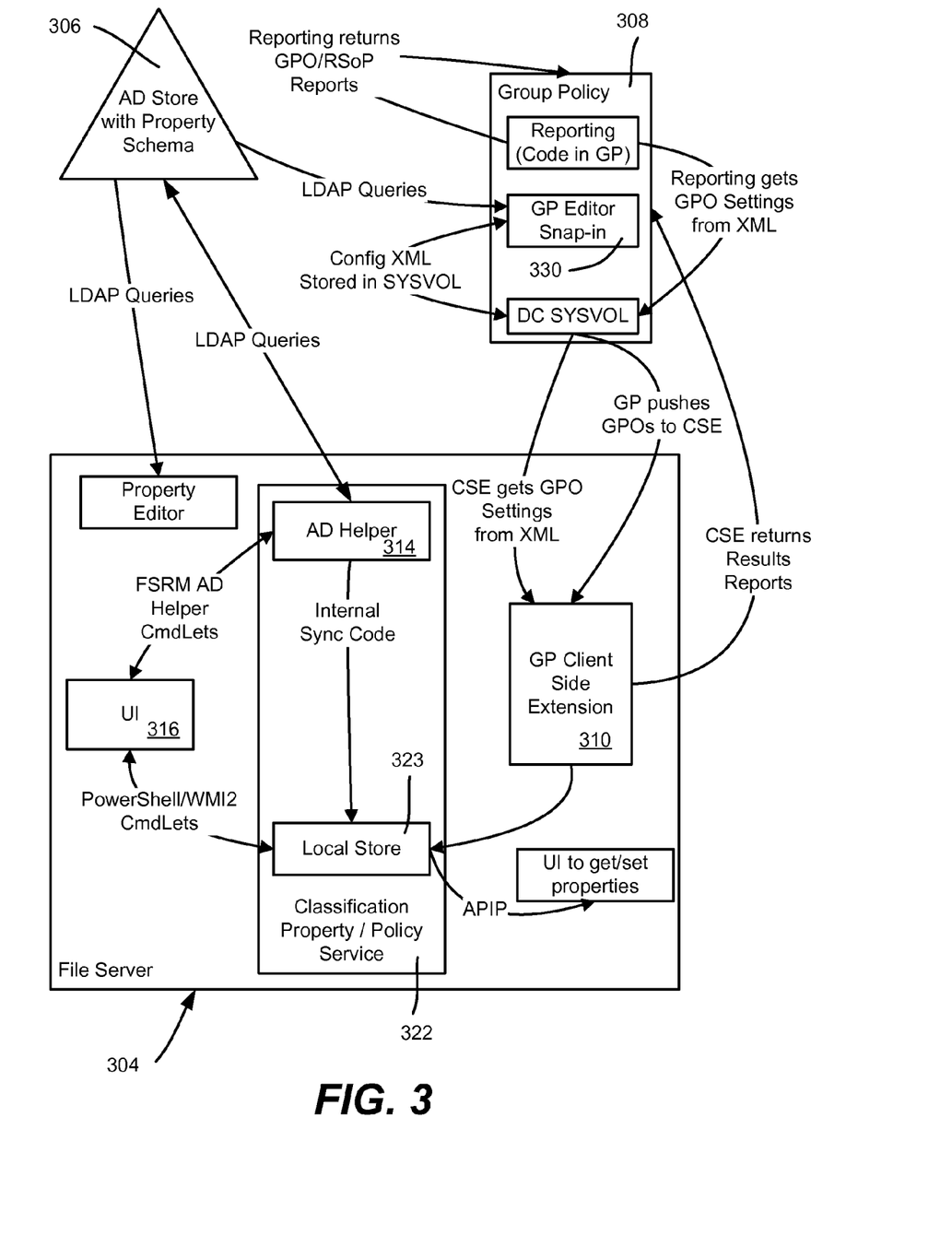
FIG. 3 is a block diagram representing components of an example implementation, in which defined resource properties are provided, and set to map global policy to machines for resource management.

FIG. 3 is a block diagram similar to FIG. 1 but showing a more particular implementation for a file server 302 in a Windows® operating system-based environment. The components labeled 3xx in FIG. 3 generally correspond to those labeled 1xx in FIG. 1; note that the classification property/policy service 322 maintains the obtained policy and property definitions in a local store 323, and that the AD helper 314 (corresponding to the mechanism 112 of FIG. 1) is incorporated into the service 322. In other words, returning to FIG. 1, note that in one implementation the property mechanism 112 that obtains the property definitions, and the policy application mechanism 122 that applies the policy, are incorporated into the same classification property/policy service (as indicated by the dashed line between these components; however this is not a requirement). For brevity, FIG. 3 is described in conjunction with FIGS. 4-7.

Figure 4:
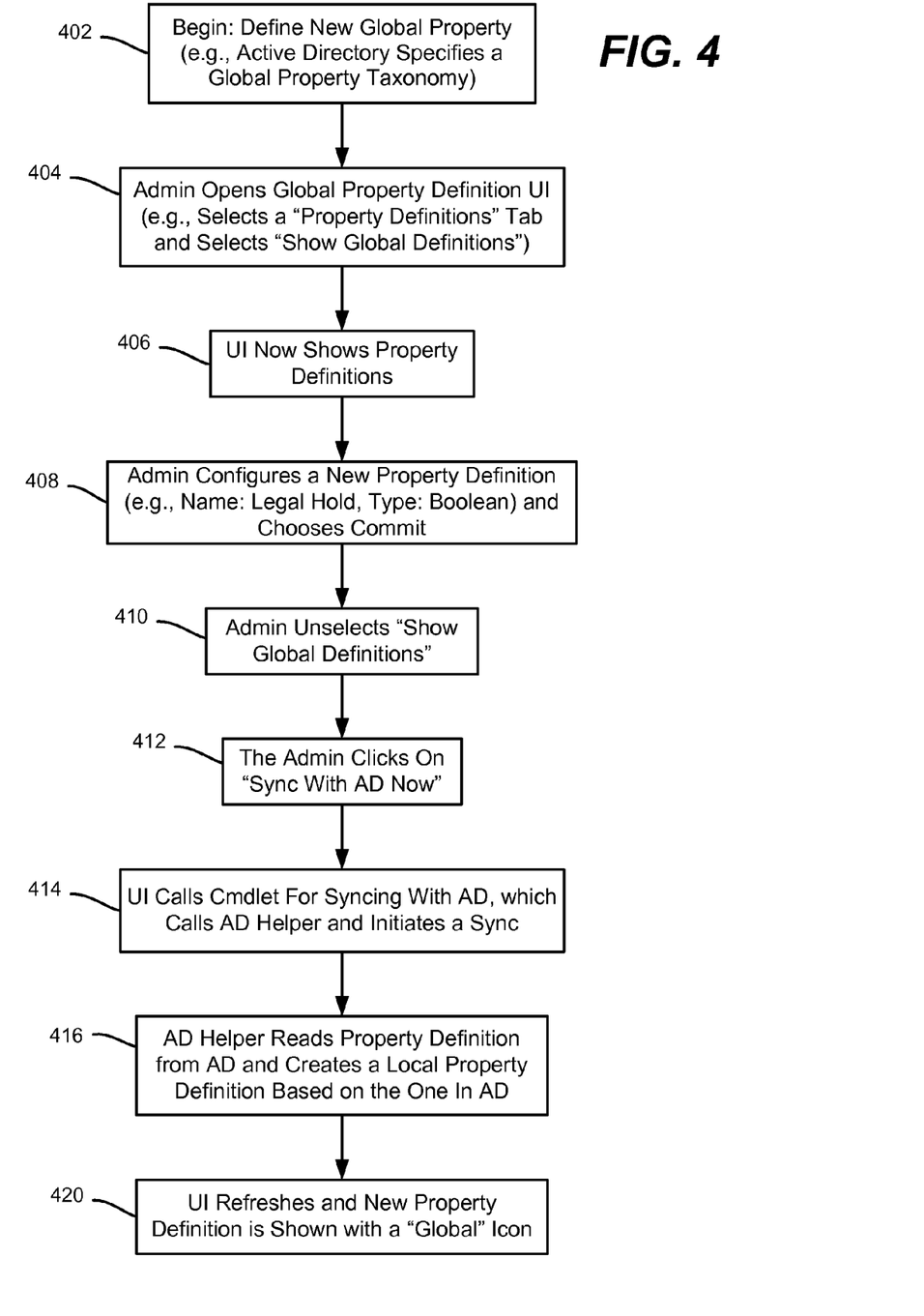
FIG. 4 is a flow diagram representing example steps for defining and making available a global resource property.

FIG. 4 shows a basic workflow in one implementation corresponding to that of FIG. 3, from the perspective of a central administrator (Admin) or the like, beginning at step 402 wherein a new global property is defined. As described above, Active Directory® is one way to specify and make available such a global property taxonomy. For example, at step 402 the administrator may open a Global Property definition UI 316 (FIG. 3), select a "Property Definitions" tab and select "show global definitions", whereby at step 406 the UI 316 will show any property definitions, which in this example may be none at this time.

At step 408, the administrator configures a new property definition (e.g., Name: Legal Hold, Type: Boolean) and chooses commit, and at step 410 unselects the "show global definitions." At step 412 the administrator clicks on "Sync with AD now."

As represented in FIG. 3 and by step 414 of FIG. 4, the UI 316 calls a Cmdlet or the like for synchronizing with the AD 306, which in turn calls the AD Helper 314 and initiates a synchronization operation. At step 416 the AD Helper 314 reads the property definition from the AD 306 and creates a local property definition based on the one in the AD 306. The UI 316 refreshes and the new property definition is shown, e.g., accompanied with a "global" icon (step 420).

In general, only central administrators are allowed to define the property taxonomy, so as to ensure consistency with global policy. However, a local machine administrator may locally extend the taxonomy, such as for the resources of one machine or a group of machines that he or she administrates. A "local" group policy may then be applied to that machine or set of machines. In this way, a local administrator can, for example, label folders with metadata specific to those local folders and the local machine or machines, such as corresponding to a local backup-related policy, and have the local policy applied to the folders regardless of where those folders are moved in storage within the local machine or machines.

Figure 5:
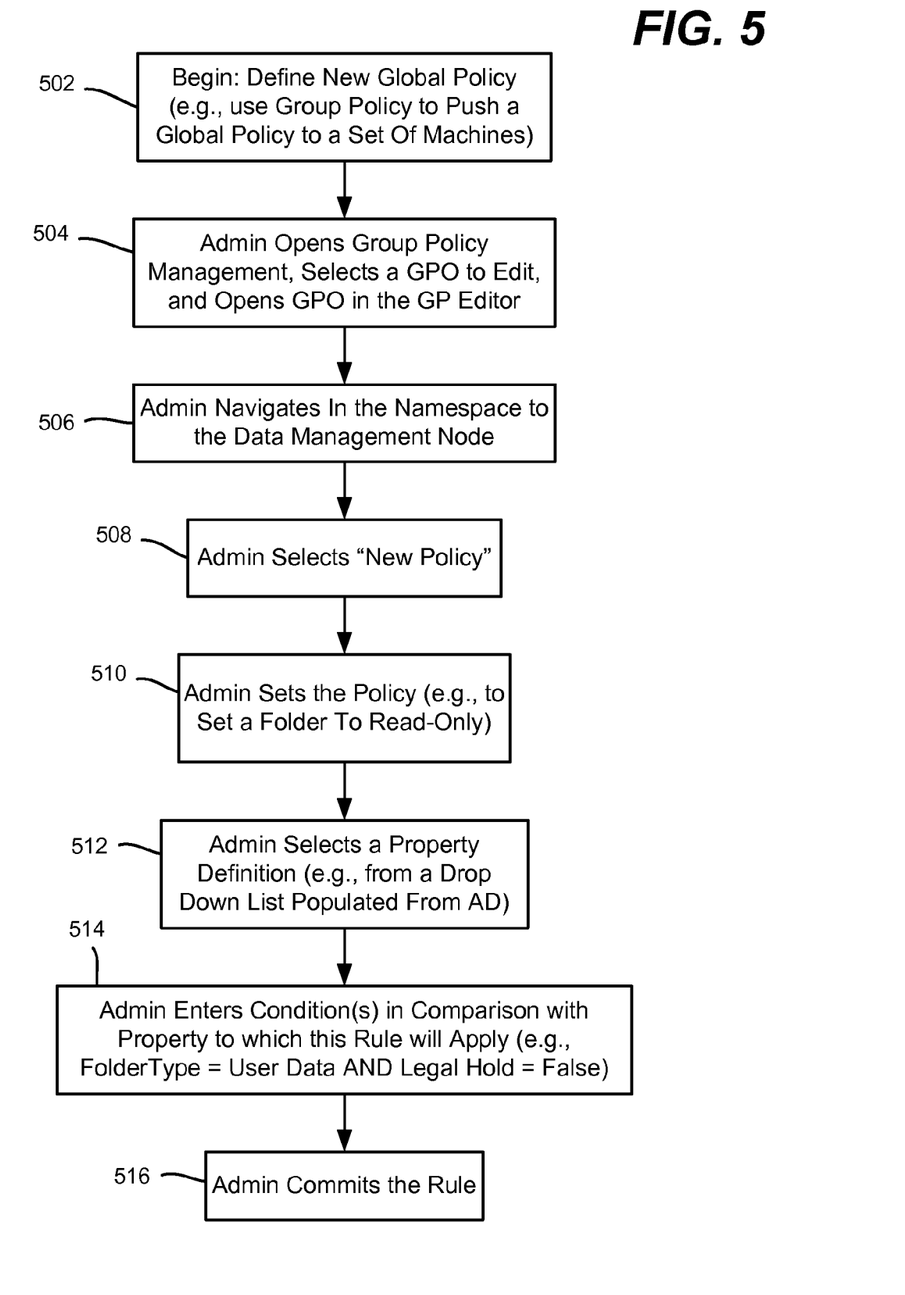
FIG. 5 is a flow diagram representing example steps for defining and making available global policy.

FIG. 5 is directed towards the global policy aspects, beginning at step 502 where the administrator (not necessarily the same administrator who defined the property) defines a new global policy. In this example, Group Policy (GP) is described as a technology that pushes a global policy to a set of machines, however any other suitable mechanism/technology may be used, including technology where machines can pull global policy.

In the example of FIG. 5, the administrator opens Group Policy Management, selects a group policy object (GPO) to edit, and opens it in a GP Editor 330 (FIG. 3). At steps 506 and 508, the administrator navigates in the namespace to a Data Management node and selects "New Policy."

From there, the administrator sets the policy (step 510), such as to set a folder to read-only. The administrator may select a property definition from a drop down list or the like (step 512), which in this example is populated from the AD 306, and at step 514 may enters the condition in comparison with the property to which this rule will apply; (e.g., FolderType=User Data and Legal Hold=false). At step 516 the administrator commits the rule.

Figure 6:
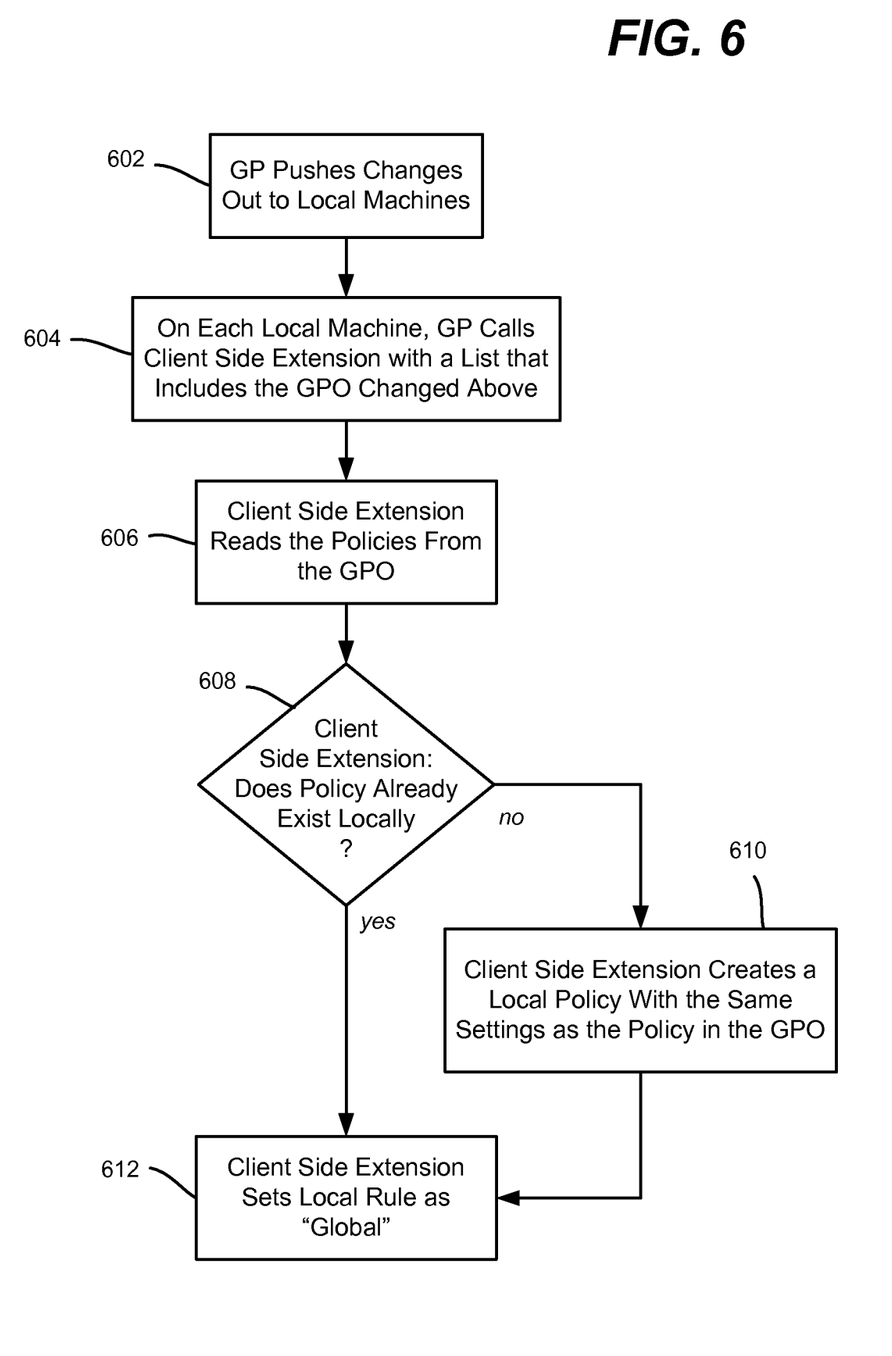
FIG. 6 is a flow diagram representing example steps for handling global policy when received at a local machine.

As represented in FIG. 6, sometime later the Group Policy mechanism 308 pushes the changes out to the local machines at step 602. To this end, corresponding to step 604, the GP calls the client side extension 310 (FIG. 3) of each local machine, and provides the client side extension 310 with a list that includes the above-changed group policy object.

At step 606, the client side extension 310 reads the policies from the group policy object, and at step 608 checks to see if the policy already exists locally. If the policy does not exist, at step 610 the client side extension 310 creates a local policy with the same settings as the policy in the group policy object. At step 612 the client side extension 310 sets this local rule as "global."

Figure 7:
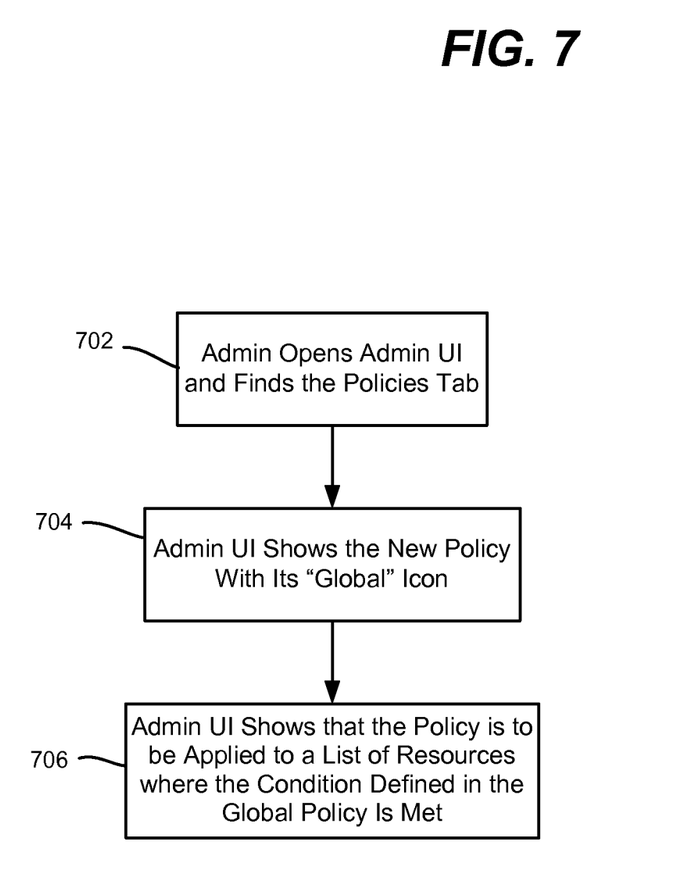
FIG. 7 is a flow diagram representing example steps for determining how global policy is to be applied to resources.

At this time, if the administrator opens the admin UI and selects the "Policies" tab, the UI shows the new policy with its "global" icon, as represented by steps 702 and 704 of FIG. 7. The UI shows that the policy is being/to be applied to a list of folders where the condition defined in the global policy is met (step 706).

In this way, by associating policy-related metadata with a resource, global policy is selectively and/or differently applied to resources of a machine; the resources may be different on each machine. A local administrator (typically not the central administrator who defined the global policy) identifies each resource, and sets the property settings which are then associated via metadata with that resource. Thus, a local administrator does not have to deal with policy, and only manage the resources/properties of the local administrator's machines. At the same time, central administrators/ global policy authors do not have to deal with individual machines, and instead only have to define policy for types of resources.

Exemplary Networked and Distributed Environments

One of ordinary skill in the art can appreciate that the various embodiments and methods described herein can be implemented in connection with any computer or other client or server device, which can be deployed as part of a computer network or in a distributed computing environment, and can be connected to any kind of data store or stores. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the resource management mechanisms as described for various embodiments of the subject disclosure.

Figure 8:
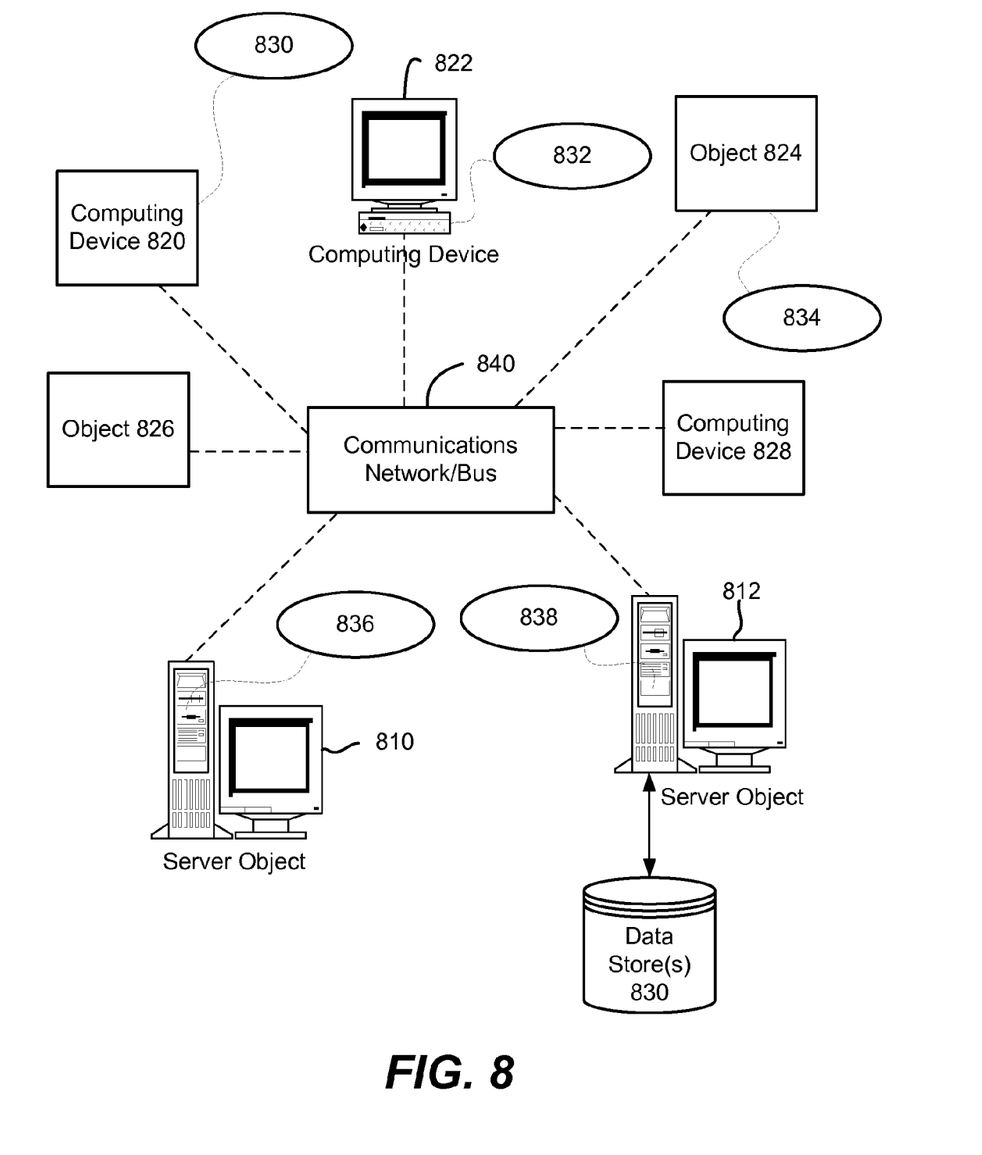
FIG. 8 is a block diagram representing exemplary non-limiting networked environments in which various embodiments described herein can be implemented.

FIG. 8 provides a schematic diagram of an exemplary networked or distributed computing environment. The distributed computing environment comprises computing objects 810, 812, etc., and computing objects or devices 820, 822, 824, 826, 828, etc., which may include programs, methods, data stores, programmable logic, etc. as represented by example applications 830, 832, 834, 836, 838. It can be appreciated that computing objects 810, 812, etc. and computing objects or devices 820, 822, 824, 826, 828, etc. may comprise different devices, such as personal digital assistants (PDAs), audio/video devices, mobile phones, MP3 players, personal computers, laptops, etc.

Each computing object 810, 812, etc. and computing objects or devices 820, 822, 824, 826, 828, etc. can communicate with one or more other computing objects 810, 812, etc. and computing objects or devices 820, 822, 824, 826, 828, etc. by way of the communications network 840, either directly or indirectly. Even though illustrated as a single element in FIG. 8, communications network 840 may comprise other computing objects and computing devices that provide services to the system of FIG. 8, and/or may represent multiple interconnected networks, which are not shown. Each computing object 810, 812, etc. or computing object or device 820, 822, 824, 826, 828, etc. can also contain an application, such as applications 830, 832, 834, 836, 838, that might make use of an API, or other object, software, firmware and/or hardware, suitable for communication with or implementation of the application provided in accordance with various embodiments of the subject disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the systems as described in various embodiments.

Thus, a host of network topologies and network infrastructures, such as client/server, peer-to-peer, or hybrid architectures, can be utilized. The "client" is a member of a class or group that uses the services of another class or group to which it is not related. A client can be a process, e.g., roughly a set of instructions or tasks, that requests a service provided by another program or process. The client process utilizes the requested service without having to "know" any working details about the other program or the service itself.

In a client/server architecture, particularly a networked system, a client is usually a computer that accesses shared network resources provided by another computer, e.g., a server. In the illustration of FIG. 8, as a non-limiting example, computing objects or devices 820, 822, 824, 826, 828, etc. can be thought of as clients and computing objects 810, 812, etc. can be thought of as servers where computing objects 810, 812, etc., acting as servers provide data services, such as receiving data from client computing objects or devices 820, 822, 824, 826, 828, etc., storing of data, processing of data, transmitting data to client computing objects or devices 820, 822, 824, 826, 828, etc., although any computer can be considered a client, a server, or both, depending on the circumstances.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server.

In a network environment in which the communications network 840 or bus is the Internet, for example, the computing objects 810, 812, etc. can be Web servers with which other computing objects or devices 820, 822, 824, 826, 828, etc. communicate via any of a number of known protocols, such as the hypertext transfer protocol (HTTP). Computing objects 810, 812, etc. acting as servers may also serve as clients, e.g., computing objects or devices 820, 822, 824, 826, 828, etc., as may be characteristic of a distributed computing environment.

Exemplary Computing Device

As mentioned, advantageously, the techniques described herein can be applied to any device. It can be understood, therefore, that handheld, portable and other computing devices and computing objects of all kinds are contemplated for use in connection with the various embodiments. Accordingly, the below general purpose remote computer described below in FIG. 9 is but one example of a computing device.

Embodiments can partly be implemented via an operating system, for use by a developer of services for a device or object, and/or included within application software that operates to perform one or more functional aspects of the various embodiments described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 9:
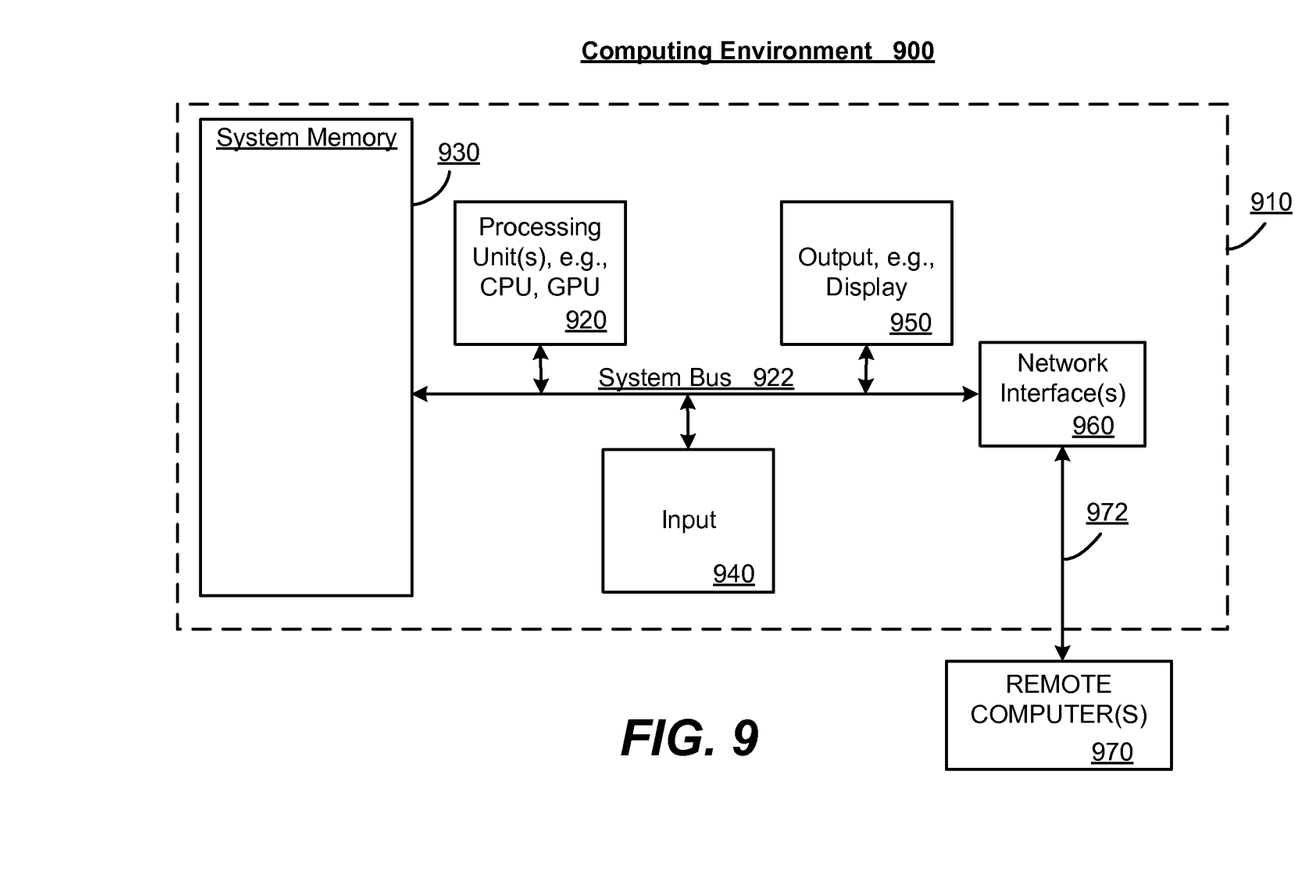
FIG. 9 is a block diagram representing an exemplary non-limiting computing system or operating environment in which one or more aspects of various embodiments described herein can be implemented.

FIG. 9 thus illustrates an example of a suitable computing system environment 900 in which one or aspects of the embodiments described herein can be implemented, although as made clear above, the computing system environment 900 is only one example of a suitable computing environment and is not intended to suggest any limitation as to scope of use or functionality. In addition, the computing system environment 900 is not intended to be interpreted as having any dependency relating to any one or combination of components illustrated in the exemplary computing system environment 900.

With reference to FIG. 9, an exemplary remote device for implementing one or more embodiments includes a general purpose computing device in the form of a computer 910. Components of computer 910 may include, but are not limited to, a processing unit 920, a system memory 930, and a system bus 922 that couples various system components including the system memory to the processing unit 920.

Computer 910 typically includes a variety of computer readable media and can be any available media that can be accessed by computer 910. The system memory 930 may include computer storage media in the form of volatile and/or nonvolatile memory such as read only memory (ROM) and/or random access memory (RAM). By way of example, and not limitation, system memory 930 may also include an operating system, application programs, other program modules, and program data.

A user can enter commands and information into the computer 910 through input devices 940. A monitor or other type of display device is also connected to the system bus 922 via an interface, such as output interface 950. In addition to a monitor, computers can also include other peripheral output devices such as speakers and a printer, which may be connected through output interface 950.

The computer 910 may operate in a networked or distributed environment using logical connections to one or more other remote computers, such as remote computer 970. The remote computer 970 may be a personal computer, a server, a router, a network PC, a peer device or other common network node, or any other remote media consumption or transmission device, and may include any or all of the elements described above relative to the computer 910. The logical connections depicted in FIG. 9 include a network 972, such local area network (LAN) or a wide area network (WAN), but may also include other networks/buses. Such networking environments are commonplace in homes, offices, enterprise-wide computer networks, intranets and the Internet.

As mentioned above, while exemplary embodiments have been described in connection with various computing devices and network architectures, the underlying concepts may be applied to any network system and any computing device or system in which it is desirable to improve efficiency of resource usage.

Also, there are multiple ways to implement the same or similar functionality, e.g., an appropriate API, tool kit, driver code, operating system, control, standalone or downloadable software object, etc. which enables applications and services to take advantage of the techniques provided herein. Thus, embodiments herein are contemplated from the standpoint of an API (or other software object), as well as from a software or hardware object that implements one or more embodiments as described herein. Thus, various embodiments described herein can have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim.

As mentioned, the various techniques described herein may be implemented in connection with hardware or software or, where appropriate, with a combination of both. As used herein, the terms "component," "module," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described herein, methodologies that may be implemented in accordance with the described subject matter can also be appreciated with reference to the flowcharts of the various figures. While for purposes of simplicity of explanation, the methodologies are shown and described as a series of blocks, it is to be understood and appreciated that the various embodiments are not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, some illustrated blocks are optional in implementing the methodologies described hereinafter.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various embodiments described herein, it is to be understood that other similar embodiments can be used or modifications and additions can be made to the described embodiment(s) for performing the same or equivalent function of the corresponding embodiment(s) without deviating therefrom. Still further, multiple processing chips or multiple devices can share the performance of one or more functions described herein, and similarly, storage can be effected across a plurality of devices. Accordingly, the invention is not to be limited to any single embodiment, but rather is to be construed in breadth, spirit and scope in accordance with the appended claims.

What is claimed is:

1. A computer implemented method, the method comprising:
    receiving, by a client, a set of defined property definitions, wherein the set of defined property definitions applies to a plurality of machines, wherein the plurality of machines includes the client;
    maintaining, by the client, property metadata associated with a resource of the client;
    receiving, by the client, a policy that is applicable to the plurality of machines, wherein whether the policy applies to the resource is determined based at least in part on at least one property definition of the set of defined property definitions;
    determining, by the client, that the resource meets the at least one property definition based at least in part on the property metadata;
    applying, by the client, the policy to the resource;
    updating, by the client, the resource, wherein updating the resource comprises updating the property metadata;
    determining, by the client, that the resource no longer meets the at least one property definition; and
    removing, by the client, the policy from the resource based on the update to the resource.

2. The method of claim 1 wherein the policy has a condition that references a property definition.

3. The method of claim 1 wherein the resource comprises a folder, share, UNC path or file, and wherein maintaining the property metadata comprises maintaining the property metadata within a file in the folder, share, or UNC path.

4. The method of claim 1 wherein the resource comprises a folder, share, UNC path or file, and wherein maintaining the property metadata comprises maintaining a folder, share, UNC path or file type property setting.

5. The method of claim 1 wherein the resource comprises a folder, share, UNC path or file, and wherein maintaining the property metadata comprises maintaining a secrecy level property setting, or maintaining a business impact level property setting, or maintaining a legal hold property setting, or maintaining any combination of a secrecy level property setting, a business impact level property setting, or a legal hold property setting.

6. The method of claim 1 further comprising, obtaining a second policy that is applicable to only the client, and using the property metadata to determine whether to apply the second policy to the resource.

7. The method of claim 1 wherein the property metadata is changed into changed metadata, and further comprising, using the changed metadata to determine whether to apply the policy to the resource.

8. One or more computer storage media having computer-executable instructions, which when executed perform steps, comprising:
    obtaining a set of property definitions by a first client, wherein the set of property definitions applies to a plurality of computing machines, including the first client;
    obtaining by the first client a policy that applies to the plurality of computing machines, wherein the policy is associated with at least one property definition in the set of property definitions, wherein the policy is obtained without being requested by the first client;
    maintaining by the first client property metadata in association with a resource of the first client, in which the property metadata represents at least one setting corresponding to the at least one property definition;
    determining by the first client that the policy uses the at least one property definition represented by the property metadata; and
    applying at least part of the policy to the resource;
    updating the resource, wherein updating the resource comprises updating the property metadata;
    determining that the resource no longer meets the at least one property definition; and
    removing the policy from the resource.

9. The one or more computer storage media of claim 8 wherein the resource comprises a folder, share, UNC path or file, and wherein maintaining the property metadata in association with the resource comprises maintaining the property metadata within a metadata file in the folder, share, or UNC path.

10. The one or more computer storage media of claim 8 wherein the resource comprises a folder, share, UNC path or file, and wherein applying at least part of the policy comprises performing an action to a metadata file within the folder, share or UNC.

11. The one or more computer storage media of claim 8 wherein the resource comprises a folder, share, UNC path or file, and wherein maintaining the property metadata is maintaining a secrecy level property setting, maintaining a business impact level property setting, maintaining a legal hold property setting, maintaining any combination of a secrecy level property setting, maintaining a business impact level property setting, or maintaining a legal hold property setting.

12. The one or more computer storage media of claim 8 wherein the policy has a condition that references a property definition.

13. The one or more computer storage media of claim 8 further comprising, obtaining property definitions for properties of resources.

14. The one or more computer storage media of claim 8 further comprising, obtaining policy that is local to the first client, and using the property metadata to determine whether to apply the policy that is local to the first client to the resource.

15. A system comprising:

at least one computer processor;

memory, in electronic communication with the at least one computer processor, the memory including instructions that, when executed by the at least one computer processor, cause the at least one computer processor to perform a method, the method comprising:

receiving, by a client, a set of defined property definitions, wherein the set of defined property definitions applies to a plurality of machines, wherein the plurality of machines includes the client;

maintaining, by the client, property metadata associated with a resource of the client;

receiving, by the client, a policy that is applicable to the plurality of machines, wherein whether the policy applies to the resource is determined based at least in part on at least one property definition of the set of defined property definitions;

determining, by the client, that the resource meets the at least one property definition based at least in part on the property metadata;

applying, by the client, the policy to the resource;

updating, by the client, the resource, wherein updating the resource comprises updating the property metadata;

determining, by the client, that the resource no longer meets the at least one property definition; and removing, by the client, the policy from the resource based on the update to the resource.

16. The system of claim 15, wherein the policy has a condition that references a property definition.

17. The system of claim 15, wherein the resource comprises a folder, share, UNC path or file, and wherein maintaining the property metadata comprises maintaining the property metadata within a file in the folder, share, or UNC path.

18. The system of claim 15, wherein the resource comprises a folder, share, UNC path or file, and wherein maintaining the property metadata comprises maintaining a folder, share, UNC path or file type property setting.

19. The system of claim 15, wherein the resource comprises a folder, share, UNC path or file, and wherein maintaining the property metadata comprises maintaining a secrecy level property setting, or maintaining a business impact level property setting, or maintaining a legal hold property setting, or maintaining any combination of a secrecy level property setting, a business impact level property setting, or a legal hold property setting.

20. The system of claim 15, wherein the method further comprises: obtaining a second policy that is applicable to only the client, and using the property metadata to determine whether to apply the second policy to the resource.

* * * * *